United States Patent
Hwang et al.

(10) Patent No.: US 6,785,043 B2
(45) Date of Patent: Aug. 31, 2004

(54) DISPERSION-COMPENSATED OPTICAL FIBER AMPLIFIER

(75) Inventors: Seong-Taek Hwang, Pyungtaek-shi (KR); Kwan-Woong Song, Seoul (KR); Sung-Tae Kim, Suwon-shi (KR); Young-Hoon Joo, Yongin-shi (KR); Sung-Jin Park, Yongin-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 149 days.

(21) Appl. No.: 10/236,158

(22) Filed: Sep. 6, 2002

(65) Prior Publication Data

US 2003/0048977 A1 Mar. 13, 2003

(30) Foreign Application Priority Data

Sep. 11, 2001 (KR) ........................................ 2001-55834

(51) Int. Cl.$^7$ ................................................ H01S 3/00
(52) U.S. Cl. ..................................................... 359/337.5
(58) Field of Search ............................. 359/337.5, 349

(56) References Cited

U.S. PATENT DOCUMENTS

| | | | | |
|---|---|---|---|---|
| 5,404,413 A | * | 4/1995 | Delavaux et al. | 385/15 |
| 5,596,448 A | * | 1/1997 | Onaka et al. | 359/337.5 |
| 6,154,588 A | * | 11/2000 | Kai | 385/27 |
| 6,332,054 B1 | * | 12/2001 | Ito | 385/123 |
| 6,411,413 B1 | * | 6/2002 | Bergano | 398/200 |
| 6,421,167 B1 | * | 7/2002 | Cohen et al. | 359/337 |
| 6,462,862 B2 | * | 10/2002 | Kinoshita | 359/334 |
| 6,480,312 B1 | * | 11/2002 | Okuno et al. | 398/158 |
| 6,493,133 B1 | * | 12/2002 | Liang et al. | 359/349 |
| 2002/0076159 A1 | * | 6/2002 | Kosaka et al. | 385/39 |
| 2002/0118446 A1 | * | 8/2002 | Lee et al. | 359/341.2 |
| 2002/0141046 A1 | * | 10/2002 | Joo et al. | 359/341.2 |
| 2002/0149843 A1 | * | 10/2002 | Lee et al. | 359/349 |

* cited by examiner

*Primary Examiner*—Thomas G. Black
*Assistant Examiner*—Deandra M. Hughes
(74) *Attorney, Agent, or Firm*—Cha & Reiter, L.L.C.

(57) ABSTRACT

Disclosed is a dispersion-compensated optical-fiber amplifier including a circulator for outputting an optical signal received at a first terminal to a second terminal, while outputting an optical signal received at the second terminal to a third terminal; a first amplifier for amplifying the optical signal from the second terminal and an optical signal reapplied thereto; a dispersion-compensating fiber for compensating for a dispersion occurring in the optical signal received from the first amplifier and an optical signal reapplied thereto; a second amplifier for amplifying the optical signal from the dispersion-compensating fiber and an optical signal reapplied thereto; a splitter installed on the dispersion-compensating fiber and adapted to output to the dispersion-compensating fiber, an optical signal applied thereto and an optical signal reapplied thereto, while outputting a pumping light applied to one end thereof and adapted to pump both the first and second amplifiers to the other end thereof without allowing the pumping light to pass through the dispersion-compensating fiber; and, a reflector for reflecting back an optical signal from the second amplifier, so that the reflected optical signal is reapplied to the second amplifier, the splitter, the first amplifier, and the circulator, in this order.

19 Claims, 4 Drawing Sheets

FIG. 1  [PRIOR ART]

DISPERSION-COMPENSATED OPTICAL FIBER AMPLIFIER

CLAIM OF PRIORITY

This application makes reference to and claims all benefits accruing under 35 U.S.C. Section 119 from an application entitled, "DISPERSION-COMPENSATED OPTICAL FIBER AMPLIFIER," filed in the Korean Industrial Property Office on Sep. 11, 2001 and there duly assigned Serial No. 55834/2001.

BACKGROUND OF THE INVENTION

1. Field of the Invention

The present invention relates to optical-communication systems and in particular to an optical-fiber amplifier disposed between an optical transmitter and an optical receiver for amplification of optical signals.

2. Description of the Related Art

In order to meet a greater demand to transmit a large amount of data in optical-communication systems, wavelength-division-multiplexing (WDM) optical-communication systems have been introduced to increase the transmission capacity. Such an increase in transmission capacity may be achieved by increasing the number of channels to be transmitted or by increasing the transmission rate of data. Currently, the data-transmission rate available in the market ranges from 2.5 Gb/s up to 10 Gb/s. To enhance a higher data-transmission rate, a number of research efforts are being made. In WDM optical-communication systems, a plurality of channels according to respective propagating modes is transmitted through a link—that is, an optical fiber. However, each channel transmitted through the optical fiber is attenuated in proportion to the travel distance thereof. To address this problem, an optical-fiber amplifier is installed on the optical fiber in order to amplify the attenuated channel. Meanwhile, dispersion effects are severely increased at a transmission rate of 10 Gb/s or more. As such, dispersion-compensating fibers are also used in order to compensate for the dispersion occurring during a transmission procedure.

FIG. 1 is a view illustrating the configuration of a conventional optical-fiber amplifier and includes the first through fourth isolators 120, 160, 180, and 220; the first and second pumping light sources 140 and 210; the first and second wavelength-selective couplers 130 and 200; the first and second erbium-doped fibers 150 and 190; and, a dispersion-compensating fiber (DCF) 170.

The first isolator 120 allows an optical signal inputted to the optical-fiber amplifier to pass there-through, while cutting off an optical signal received thereto in a direction opposite that of the input optical signal—an optical signal received thereto via the first wavelength-selective coupler 130.

The first wavelength-selective coupler 130 couples the optical signal received from the first isolator 120 with a pumping light received from the first pumping light source 140 and outputs the resultant signal to the first erbium-doped fiber 150.

The first pumping-light source 140 pumps the first erbium-doped fiber 150, that is, it excites erbium ions in the first erbium-doped fiber 150. The first pumping-light source 140 may comprise a laser diode adapted to output a pumping light.

The first erbium-doped fiber 150 performs a forward pumping operation by the pumping light received from the first pumping-light source 140 via the first wavelength-selective coupler 130, thereby amplifying the optical signal received from the first wavelength-selective coupler 130.

The second isolator 160 allows an optical signal received from the first erbium-doped fiber 150 to pass there-through, while cutting off an optical signal received thereto in a direction opposite that of the optical signal received from the first erbium-doped fiber 150.

The DCF 170 compensates for a dispersion occurring in the amplified optical signal received from the second isolator 160. The length of the DCF 170 is determined, taking into consideration the transmission distance of the optical signal. That is, the DCF 170 has an increased length when the transmission distance of the optical signal is increased, which means the dispersion degree of the optical signal is more severe.

The third isolator 180 allows the optical signal received from the DCF 170 to pass there-through, while cutting off the optical signal received in a direction opposite to the optical signal received from the DCF 170.

The second erbium-doped fiber 190 performs a reverse pumping operation by the pumping light received from the second pumping-light source 210 via the second wavelength-selective coupler 200, thereby amplifying the optical signal received from the third isolator 180. The second erbium-doped fiber 190 serves to amplify the optical signal attenuated in intensity while passing though the DCF 170.

The second wavelength-selective coupler 200 outputs, to the second erbium-doped fiber 190, the optical signal received from the second pumping-light source 210, while outputting, to the second isolator 220, the optical signal received from the second erbium-doped fiber 190.

The fourth isolator 220 allows the optical signal received from the second wavelength-selective coupler 200 to pass there-through, while cutting off the optical signal received in a direction opposite to the optical signal received from the second wavelength-selective coupler 200.

As described above, the optical amplifier shown in FIG. 1 is equipped with the DCF 170 in order to compensate for the dispersion of the optical signal. The DCF 170 has a length proportional to the transmission distance of the optical signal. However, where the DCF 170 has an increased length, the manufacturing cost of the optical fiber amplifier increases because the DCF 170 itself is expensive.

Moreover, although the optical signal is compensated for its dispersion as it passes through the DCF 170, its intensity is reduced due to an insertion loss of the DCF 170. Accordingly, the second erbium-doped fiber 190 is arranged at the downstream end of the DCF 170 in order to amplify the attenuated optical signal. Furthermore, it is necessary to additionally use various elements such as a pumping-light source for pumping the second erbium-doped fiber 190, and a biasing circuit for driving the pumping-light source. As a result, the manufacturing cost and the volume of the optical-fiber amplifier are undesirably increased.

SUMMARY OF THE INVENTION

The present invention provides an optical-fiber amplifier capable of having an improved integration degree while being inexpensively manufactured.

In accordance with the present invention, in a wavelength-division-multiplexing optical-communication system having an optical-transmitter unit for transmitting a wavelength-division-multiplexed optical signal via an optical fiber, and an optical-receiver unit for receiving the optical signal via the optical fiber, a dispersion-compensated optical-fiber amplifier is provided. The amplifier includes a circulator for outputting an optical signal, received at a first terminal thereof connected to the optical fiber, to a second terminal thereof while outputting an optical signal received at the second terminal thereof, to a third terminal thereof connected to the optical fiber; a first amplifier for amplifying the optical signal received from the second terminal of the circulator and an optical signal reapplied thereto by utilizing an induced emission of pumped-excited ions; a dispersion-compensating fiber for compensating for a dispersion occurring in the optical signal received from the first amplifier and an optical signal reapplied thereto; a second amplifier for amplifying the optical signal received from the dispersion-compensating fiber and an optical signal re-applied thereto by utilizing an induced emission of pumped-excited ions; a splitter installed on the dispersion-compensating fiber and adapted to output, to the dispersion compensating fiber, an optical signal applied thereto and an optical signal reapplied thereto, while outputting a pumping light, applied to one end thereof and adapted to pump both the first and second amplifiers, to the other end thereof without allowing the pumping light to pass through the dispersion-compensating fiber; and, a reflector for reflecting back an optical signal received from the second amplifier, so that the reflected optical signal is sequentially reapplied to the second amplifier, the splitter, the first amplifier, and the circulator, in this order.

BRIEF DESCRIPTION OF THE DRAWINGS

The above advantages of the present invention will become more apparent by describing in detail preferred embodiments thereof with reference to the attached drawings in which.

DETAILED DESCRIPTION OF THE PREFERRED EMBODIMENTS

Now preferred embodiments of the present invention will be described in detail with reference to the annexed drawings. In the following description, a variety of specific elements such as constituent elements are described. The description of such elements has been made only for a better understanding of the present invention. Those skilled in the art will appreciate that various modifications, additions, and substitutions to the specific elements are possible without departing from the scope and spirit of the invention as disclosed in the accompanying claims.

Figure 1:
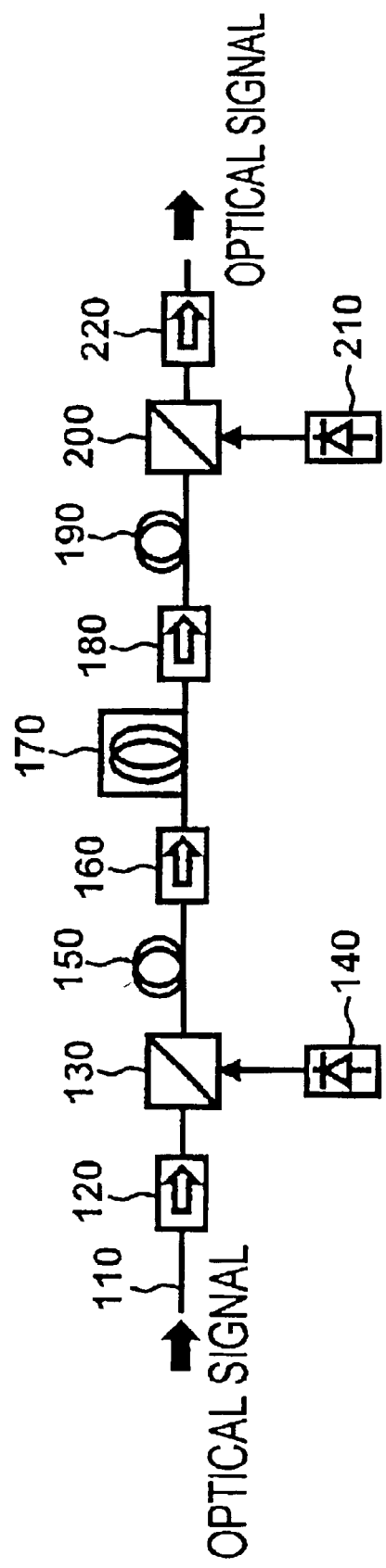
FIG. 1 is a view illustrating the configuration of a conventional optical-fiber amplifier.
Figure 2:
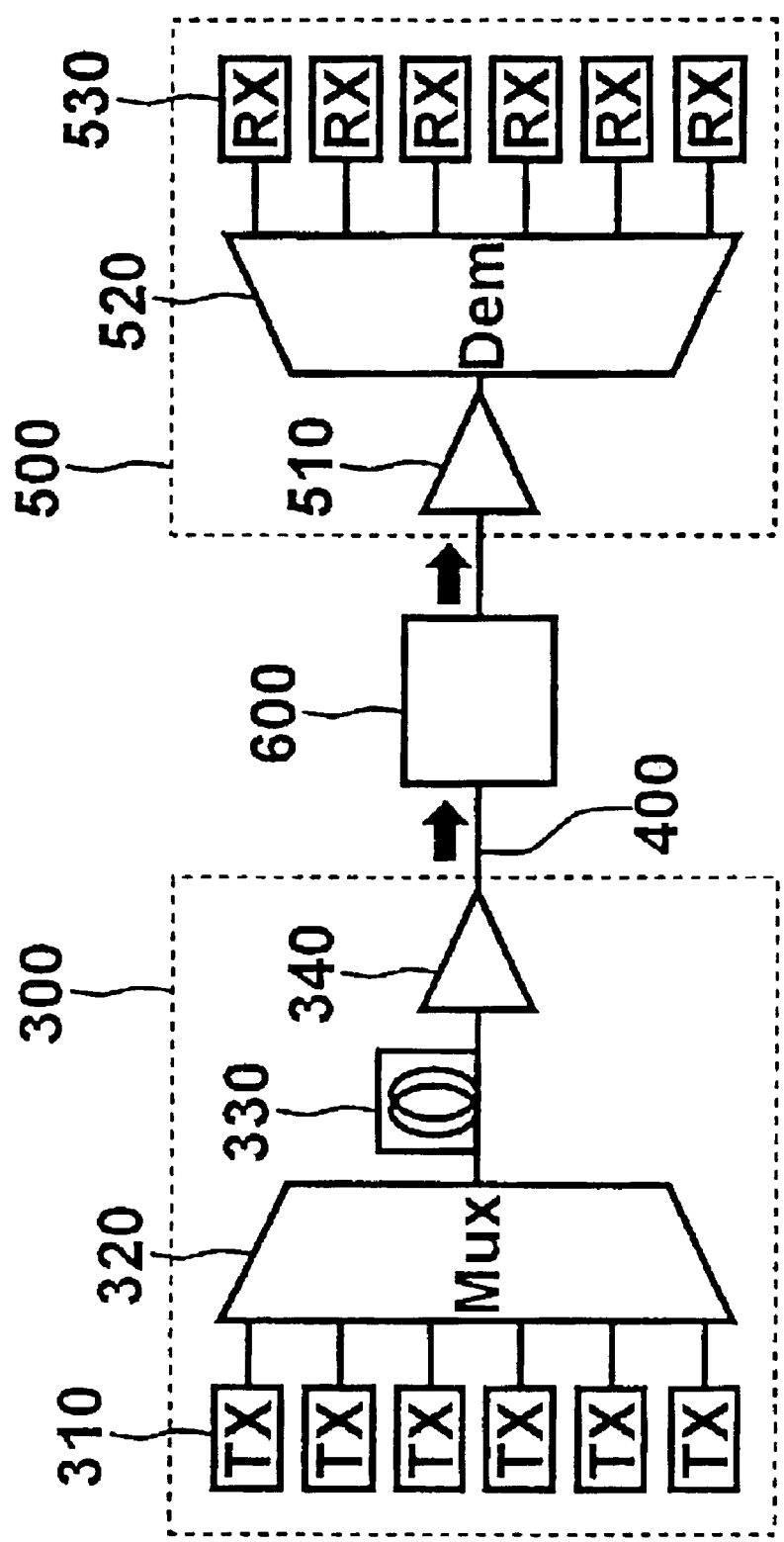
FIG. 2 is a view illustrating a WDM optical-communication system equipped with a dispersion-compensated optical-fiber amplifier according to a preferred embodiment of the present invention.

FIG. 2 is a view illustrating a WDM optical-communication system equipped with a dispersion-compensated optical-fiber amplifier according to a preferred embodiment of the present invention. The optical-communication system includes an optical-transmitter unit 300, an optical-receiver unit 500, an optical fiber 400 connecting the optical-transmitter unit 300 and optical-receiver unit 500, and a dispersion-compensated amplifier 600 arranged along the optical fiber 400.

The optical transmitter 300 includes a plurality of transmitters (TXs) 310, a wavelength-division multiplexer (Mux) 320, a first DCF 330, and an erbium-doped fiber amplifier 340. The transmitters 310 output channels with different propagating modes, respectively. The wavelength-division multiplexer 320 outputs an optical signal obtained by multiplexing the channels received from the respective transmitters 310. Each transmitter 310 may comprise a laser diode adapted to output an optical signal with a C-band (ranging from 1,525 nm to 1,565 nm). The wavelength-division multiplexer 320 may comprise a 6×1 arrayed-waveguide grating. The first DCF 330 compensates the dispersion occurring in the optical signal. Here, "dispersion" means a spreading phenomenon of the optical signal occurring due to the fact that the channels composing optical signals have different propagating modes. The erbium-doped fiber amplifier 340 amplifies the optical signal. This erbium-doped fiber amplifier 340 may comprise an erbium-doped fiber (not shown) for performing an amplification operation by utilizing an induced emission of erbium ions, a laser diode (not shown) for outputting a pumping light adapted to excite the erbium ions, and a wavelength-selective coupler (not shown) for applying the pumping light to the erbium-doped fiber.

The dispersion-compensated optical-fiber amplifier 600 serves to amplify the optical fiber inputted thereto through the optical fiber 400 while compensating for the dispersion occurring in the optical signal.

Figure 3:
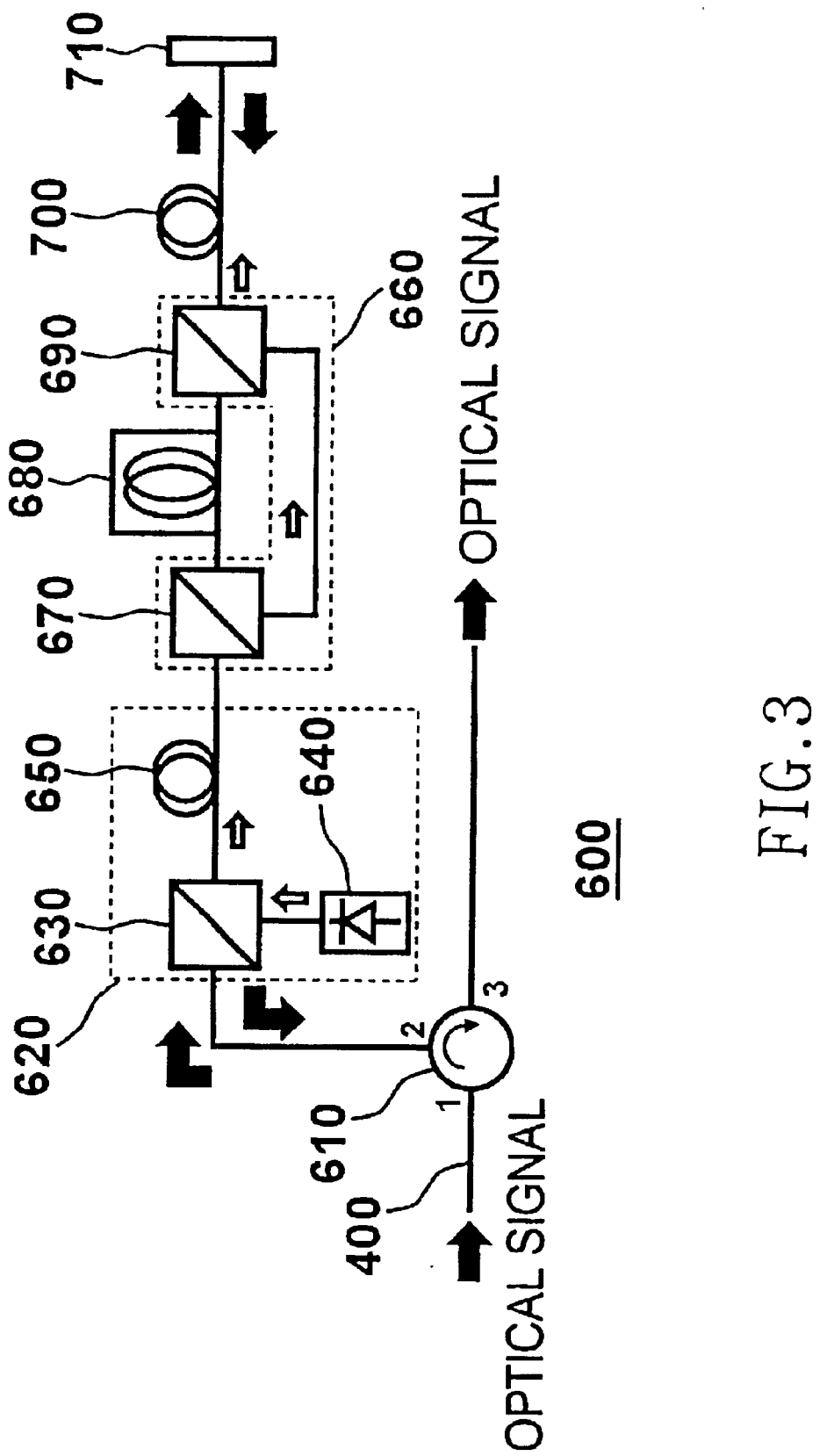
FIG. 3 is a view illustrating the configuration of the dispersion-compensated optical-fiber amplifier shown in FIG. 2; and, FIG. 4 is a graph depicting a variation in gain in the dispersion-compensated optical-fiber amplifier shown in FIG. 3.

FIG. 3 is a view illustrating the configuration of the dispersion-compensated optical-fiber amplifier 600 shown in FIG. 2. As shown in FIG. 3, the dispersion-compensated optical-fiber amplifier 600 includes a circulator 610, a first amplifier 620, a splitter 660, a second DCF 680, a second erbium-doped fiber 700 serving as a second amplifier, and a reflector 710. Respective functions of the elements composing the dispersion-compensated optical-fiber amplifier will be first described, then the traveling procedure of the optical signal inputted to the dispersion-compensated optical-fiber amplifier will be described.

The circulator 610 outputs an optical signal traveling in a forward direction, received at its first terminal connected to the optical fiber 440, to its second terminal. The circulator 610 also outputs an optical signal traveling in a reverse direction, received at its second terminal, to its third terminal connected to the optical fiber 400. In this case, the optical signals have a wavelength with a C-band ranging from 1,525 nm to 1,565 nm.

The first amplifier 620 includes a pumping-light source 640, a first wavelength-selective coupler 630, and a first erbium-doped fiber 650. The pumping-light source 640 pumps the first erbium-doped fiber 650, or, excites erbium ions in the first erbium-doped fiber 650. The first pumping-light source 640 may comprise a laser diode adapted to output a pumping light with a wavelength of 980 nm. The first wavelength-selective coupler 630 couples the optical signal received from the second terminal of the circulator 610 with the pumping light received from the pumping-light source 640 and outputs the resultant optical signal to the first erbium-doped fiber 650. The first wavelength-selective coupler 630 may comprise a wavelength-selective coupler adapted to couple wavelengths of 980 nm and 1,580 nm.

The first erbium-doped fiber 650 performs a forward pumping operation by the pumping light received from the pumping-light source 640 via the first wavelength-selective coupler 630, thereby amplifying the optical signal received from the first wavelength-selective coupler 630. The first erbium-doped fiber 650 also reamplifies the optical signal received back from the splitter 660. For the optical signal received back to the first erbium-doped fiber 650, a reverse pumping operation is carried in the first erbium-doped fiber 650 by the pumping light. That is, the travel direction of the optical signal received back to the first erbium-doped fiber 650 is opposite to the travel direction of the pumping light.

The splitter 660 includes a second wavelength-selective coupler 670, and a third wavelength-selective coupler 690. The second DCF 680 is arranged between the second and third wavelength-selective couplers 670 and 690. The second wavelength-selective coupler 670 forms one end of the splitter 660. This second wavelength-selective coupler 670 outputs the optical signal received from the first amplifier 620 to the second DCF 680, while reapplying the optical signal received back from the second DCF 680 to the first amplifier 620. The second wavelength-selective coupler 670 also outputs, to the third wavelength-selective coupler 690, the pumping light received via the first erbium-doped fiber 650. The first erbium-doped fiber 650 is set to have a gain of about 14 dB, whereas the second erbium-doped fiber 700 is set to have a gain of about 1 dB. Such setting is made to reduce cross-talk occurring between the output signal from the first or second erbium-doped fiber 650 or 700 and the output signal distorted due to a Rayleigh backscattering phenomenon. The third wavelength-selective coupler 690 forms the other end of the splitter 680. This third wavelength-selective coupler 690 outputs the optical signal received from the second DCF 680 to the second erbium-doped fiber 700, while applying back the optical signal received back from the second erbium-doped fiber 700 to the second DCF 680. The third wavelength-selective coupler 690 also outputs, to the second erbium-doped fiber 700, the pumping light received via the second wavelength-selective coupler 670.

The second DCF 680 compensates for the dispersion occurring in the optical signal received from the second wavelength-selective coupler 670 and outputs the resultant optical signal to the third wavelength-selective coupler 690. The second DCF 680 compensates back for the dispersion occurring in the optical signal received back from the third wavelength-selective coupler 690, and outputs the resultant optical signal. That is, the second DCF 680 performs the dispersion-compensating procedure two times for one optical signal. Accordingly, the second DCF 680 can have a length reduced to half the length required to completely compensate for the dispersion occurring in the optical signal. For example, where the transmission distance of the optical signal inputted to the second DCF 680 is 80 km, a DCF having a length of 40 km while exhibiting an insertion loss of 6 dB can be used for the second DCF 680.

The second erbium-doped fiber 700, which forms the second amplifier, performs a forward-pumping operation by the pumping light received via the third wavelength-selective coupler 690, thereby amplifying the optical signal received from the third wavelength-selective coupler 690. The second erbium-doped fiber 700 also reamplifies the optical signal received back from the reflector 710. For the optical signal received back from the second erbium-doped fiber 700, a reverse pumping operation is carried out in the second erbium-doped fiber 700 by the pumping light.

The reflector 710 reflects back the optical signal received from the second erbium-doped fiber 700, so that the reflected optical signal is applied back to the second erbium-doped fiber 700. An optical-fiber grating adapted to fully reflect the light of a C-band wavelength range can be used for the reflector 710.

Now, the traveling procedure of the optical signal inputted to the dispersion-compensated amplifier 600 will be described hereinafter.

The optical signal inputted to the first terminal of the circulator 610 is outputted from the second terminal of the circulator 610. The optical signal outputted from the second terminal of the circulator 610 is applied to the first wavelength-selective coupler 630. The first wavelength-selective coupler 630 couples the optical signal received from the second terminal of the circulator 610 with the pumping light received from the pumping-light source 640 and outputs the resultant optical signal to the first erbium-doped fiber 650. The first erbium-doped fiber 650 performs a forward pumping operation by the pumping light, so that it amplifies the received optical signal in accordance with an induced emission of erbium ions. The amplified optical signal is applied to the second wavelength-selective coupler 670. The pumping light passing through the first erbium-doped fiber 650 is also applied to the second wavelength-selective coupler 670.

The second wavelength-selective coupler 670 outputs the optical signal received from the first erbium-doped fiber 650 to the second DCF 680. The second wavelength-selective coupler 670 also outputs, to the third wavelength-selective coupler 690, the pumping light received via the first erbium-doped fiber 650 in order to prevent the pumping light from passing through the second DCF 680.

The second DCF 680 compensates for a dispersion occurring in the optical signal received from the first erbium-doped fiber 650 and outputs the resultant optical signal to the third wavelength-selective coupler 690. The third wavelength-selective coupler 690 couples the optical signal received from the second DCF 680 with the pumping light received from the second wavelength-selective coupler 670 and outputs the resultant optical signal to the second erbium-doped fiber 700.

The second erbium-doped fiber 700 performs a pumping operation by the pumping light received via the third wavelength-selective coupler 690, thereby amplifying the optical signal received thereto. The amplified optical fiber is applied to the reflector 710.

The reflector 710 reflects back the optical signal received from the second erbium-doped fiber 700 so that the reflected optical signal is applied back to the second erbium-doped fiber 700. The optical signal re-amplified by the second erbium-doped fiber 700 is reapplied to the second DCF 680 via the third wavelength-selective coupler 690.

The second DCF 680 compensates for a dispersion occurring in the optical signal received back thereto, then outputs the resultant optical signal. The dispersion-compensated optical signal is reapplied to the first erbium-doped fiber 650 via the second wavelength-selective coupler 670.

The optical signal re-amplified by the first erbium-doped fiber 650 is applied back to the circulator 610 via the first wavelength-selective coupler 630 which, in turn, outputs the reapplied optical signal to the optical fiber 400 at the third terminal of the circulator 610.

Figure 4:
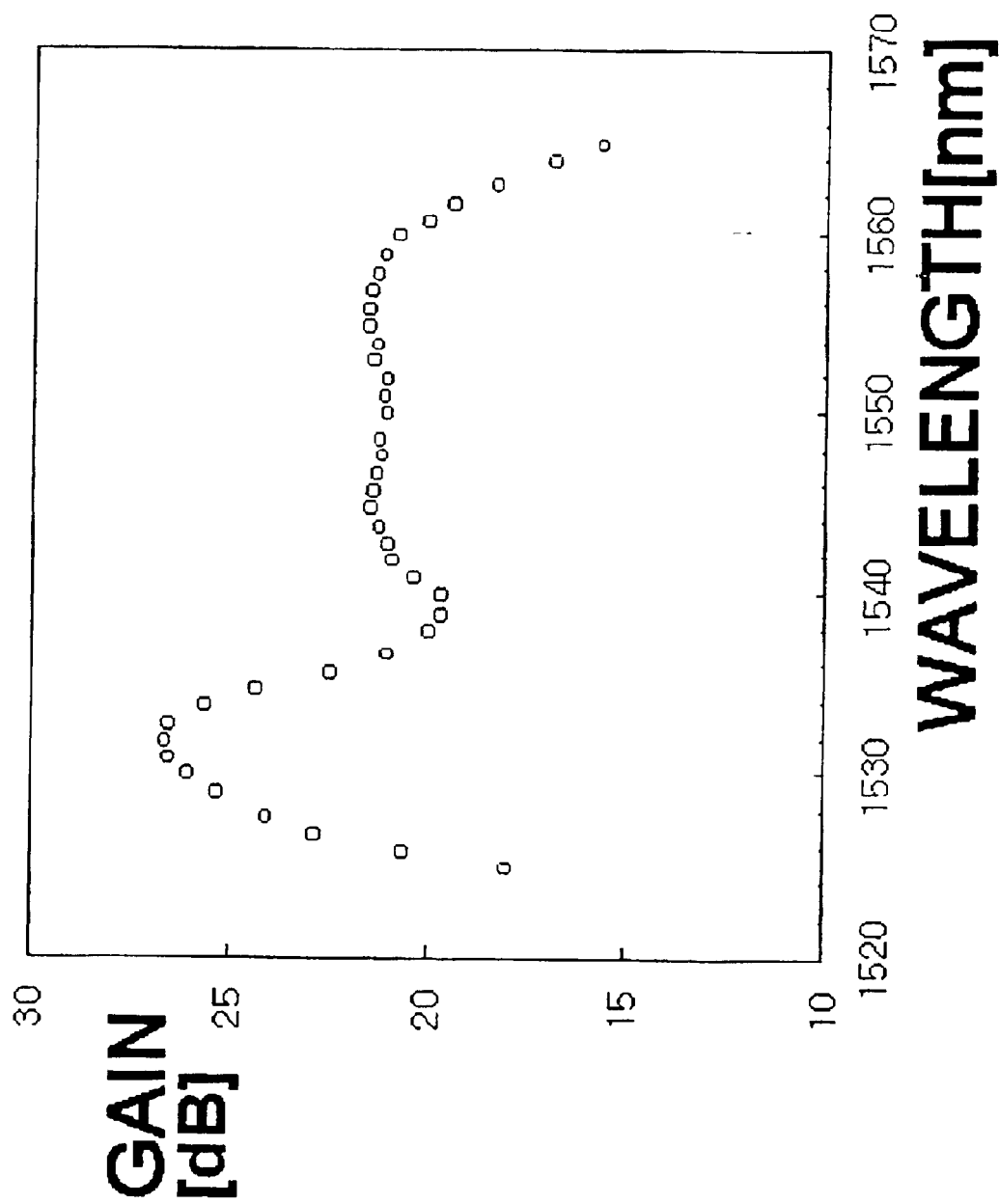

FIG. 4 is a graph depicting a variation in the gain of the dispersion-compensated optical fiber amplifier 600 shown in FIG. 3. Referring to FIG. 4, it can be seen that a maximum gain is exhibited at a wavelength of 1,530 nm.

Referring back to FIG. 2, the optical signal outputted from the dispersion-compensated optical-fiber amplifier 600 is inputted to the optical-receiver unit 500 via the optical fiber 400. The optical-receiver unit 500 includes an erbium-doped fiber amplifier 510, a wavelength-division demultiplexer (Dem) 520, and a plurality of detectors or receivers (RXs) 530. The erbium-doped fiber amplifier 510 amplifies the optical signal received via the optical fiber 400 and outputs the amplified optical signal. This erbium-doped fiber amplifier 510 may comprise an erbium-doped fiber (not shown) adapted to perform an amplification by utilizing an induced emission of erbium ions, a laser diode adapted to output a pumping light for exciting the erbium ions, and a wavelength-selective coupler (not shown) for applying the pumping light to the erbium-doped fiber.

The wavelength-division demultiplexer 520 divides the optical signal received from the second erbium-doped fiber amplifier 510 into a plurality of channels respectively with different propagating modes. A 1×6 arrayed-waveguide grating may be used for the wavelength-division demultiplexer 520. Each of the detectors 530 converts an associated one of the channels into an electrical signal. A photodiode, which is an opto-electric element, may be used for each detector 530.

As apparent from the above description, the dispersion-compensated optical amplifier according to the present invention, which is adapted to amplify an optical signal while compensating for a dispersion occurring in the optical signal, uses a circulator and a reflector to reduce the length of a DCF used therein, thereby reducing the manufacturing cost thereof while achieving a higher integration degree. In accordance with the present invention, two amplifiers having different gains are also used, thus achieving a reduction in cross-talk. In addition, it is not necessary to use additional pumping-light sources and additional biasing circuits because the pumping light is reused using a wavelength-selective coupler. Accordingly, there is an advantage in that it is possible to reduce the total manufacturing cost while achieving a higher integration degree.

While this invention has been described in connection with what is presently considered to be the most practical and preferred embodiment, it is to be understood that the invention is not limited to the disclosed embodiment; on the contrary, it is intended to cover various modifications within the spirit and scope of the appended claims.

What is claimed is:

1. In a wavelength-division multiplexing optical-communication system having an optical-transmitter unit for transmitting a wavelength-division-multiplexed optical signal via an optical fiber and an optical-receiver unit for receiving the optical signal via the optical fiber, a dispersion-compensated optical-fiber amplifier, comprising:

a circulator for outputting an optical signal received at a first terminal thereof connected to the optical fiber, to a second terminal thereof while outputting an optical signal received at the second terminal thereof, to a third terminal thereof connected to the optical fiber;

a first amplifier coupled to the second terminal of the circulator for amplifying the optical signal received thereon in a forward and a reverse direction;

a dispersion-compensating fiber coupled to the first amplifier for compensating any dispersion occurring in the optical signal received thereon;

a second amplifier coupled to the dispersion-compensating fiber for amplifying the optical signal received thereon;

a splitter installed at both ends of the dispersion-compensating fiber for passing the optical signal received thereon in a forward direction and a reverse direction and for forwarding a pumping light received in the forward direction without allowing the pumping light to pass through the dispersion-compensating fiber; and, a reflector for reflecting the optical signal received from the second amplifier in the reverse direction, so that the reflected optical signal is sequentially reapplied to the second amplifier, the splitter, the first amplifier, and the circulator.

2. The dispersion-compensated optical-fiber amplifier according to claim 1, wherein:

the first amplifier comprises a first wavelength-selective coupler for coupling the optical signal received from the second terminal of the circulator with the pumping light and for outputting the resultant optical signal while outputting to the second terminal of the circulator an optical signal re-applied thereto; and, a first erbium-doped fiber for performing a pumping operation by the pumping light, thereby amplifying the optical signal outputted from the first wavelength-selective coupler, while reamplifying an optical signal reapplied thereto, and for applying the reamplified optical signal to the first wavelength-selective coupler in a reverse direction; and, the second amplifier comprises a second erbium-doped fiber for performing a pumping operation by the pumping light received via the splitter, thereby amplifying the optical signal received from the dispersion-compensating fiber, while reamplifying an optical signal reapplied thereto, and applying the reamplified optical signal to the splitter in a reverse direction.

3. The dispersion-compensated optical-fiber amplifier according to claim 1, wherein the splitter comprises:

a second wavelength-selective coupler forming one end of the splitter, the second wavelength-selective coupler outputting the optical signal received from the first amplifier to the dispersion-compensating fiber and for applying an optical signal reapplied thereto in the reverse direction to the first amplifier, while outputting the pumping light applied to one end of the splitter to the other end of the splitter; and, a third wavelength-selective coupler forming the other end of the splitter, the third wavelength-selective coupler outputting the optical signal received from the dispersion-compensating fiber to the second amplifier and for applying an optical signal reapplied thereto in the reverse direction to the dispersion-compensating fiber, while outputting the pumping light applied thereto via the second wavelength-selective coupler to the second amplifier.

4. The dispersion-compensated optical-fiber amplifier according to claim 2, wherein the splitter comprises:

a second wavelength-selective coupler forming one end of the splitter, the second wavelength-selective coupler outputting the optical signal received from the first amplifier to the dispersion-compensating fiber and for applying an optical signal reapplied thereto in a reverse direction to the first amplifier, while outputting the pumping light applied to one end of the splitter to the other end of the splitter; and, a third wavelength-selective coupler forming the other end of the splitter, the third wavelength-selective coupler outputting the optical signal received from the dispersion-compensating fiber to the second amplifier and for applying an optical signal reapplied thereto in a reverse direction to the dispersion-compensating fiber, while outputting the pumping light applied thereto via the second wavelength-selective coupler to the second amplifier.

5. The dispersion-compensated optical-fiber amplifier according to claim 1, wherein the first and second amplifiers are set to have different gains, respectively, in order to minimize cross-talk generated in the dispersion-compensated optical-fiber amplifier.

6. The dispersion-compensated optical-fiber amplifier according to claim 2, wherein the first and second amplifiers are set to have different gains, respectively, in order to minimize cross-talk generated in the dispersion-compensated optical-fiber amplifier.

7. The dispersion-compensated optical-fiber amplifier according to claim 1, wherein the first and second amplifiers amplify the optical signal using an induced emission of pumped-excited ions.

8. A system for providing wavelength-division-multiplexing (WDM) optical signals via an optical fiber, comprising:
   a transmitter for transmitting an optical signal from one end of the optical fiber;
   a receiver for receiving the optical signal from the other end of the optical fiber; and,
   a dispersion-compensated amplifier disposed on the optical fiber between the transmitter and the receiver,
   the dispersion-compensated amplifier comprising:
      a circulator for directing the optical signal received in a forward direction and in a reverse direction;
      a first amplifier coupled to the output of the circulator for amplifying the optical signal received thereon;
      a dispersion-compensating fiber coupled to the output of the first amplifier for compensating any dispersion in the optical signal received thereon;
      a second amplifier coupled to the output of the dispersion-compensating fiber for amplifying the optical signal received thereon;
      a splitter installed at both ends of the dispersion-compensating fiber for passing the optical signal received thereon in the forward direction and the reverse direction and for forwarding a pumping light received in the forward direction without allowing the pumping light to pass through the dispersion-compensating fiber; and,
      a reflector for reflecting the optical signal received from the second amplifier in a reverse direction.

9. The system according to claim 8, wherein the first and second amplifiers are set to have different gains, respectively, in order to minimize cross-talk generated in the dispersion-compensated amplifier.

10. The system according to claim 8, wherein the first and second amplifiers amplify the optical signal using an induced emission of pumped-excited ions.

11. The system according to claim 8, wherein the first amplifier comprises:
   a first wavelength-selective coupler for coupling the optical signal received from the circulator with the pumping light; and
   a first erbium-doped fiber for amplifying the optical signal outputted from the first wavelength-selective coupler.

12. The system according to claim 8, wherein the second amplifier comprises a second erbium-doped fiber for amplifying the optical signal received from the dispersion-compensating fiber and for re-amplifying the optical signal traveling in the reverse direction.

13. The system according to claim 8, wherein the splitter comprises:
   a second wavelength-selective coupler for outputting the optical signal received from the first amplifier to the dispersion-compensating fiber, and
   a third wavelength-selective coupler for outputting the optical signal received from the dispersion-compensating fiber to the second amplifier.

14. A dispersion-compensated optical-fiber amplifier for amplifying optical signals from a transmitting end to a receiving end, comprising:
   a circulator for directing an optical signal received in a forward direction and in a reverse direction;
   a first amplifier coupled to the output of the circulator for amplifying the optical signal received thereon;
   a dispersion-compensating fiber coupled to the output of the first amplifier for compensating any dispersion in the optical signal received thereon;
   a second amplifier coupled to the output of the dispersion-compensating fiber for amplifying the optical signal received thereon;
   a splitter installed at both ends of the dispersion-compensating fiber for passing the optical signal received thereon in the forward direction and the reverse direction and for forwarding a pumping light received in the forward direction without allowing the pumping light to pass through the dispersion-compensating fiber; and,
   a reflector for reflecting the optical signal received from the second amplifier in the reverse direction.

15. The dispersion-compensated optical-fiber amplifier according to claim 14, wherein the first and second amplifiers are set to have different gains, respectively, in order to minimize cross-talk generated in the dispersion-compensated amplifier.

16. The dispersion-compensated optical-fiber amplifier according to claim 14, wherein the first and second amplifiers amplify the optical signal using an induced emission of pumped-excited ions.

17. The dispersion-compensated optical-fiber amplifier according to claim 14, wherein the first amplifier comprises:
   a first wavelength-selective coupler for coupling the optical signal received from the circulator with the pumping light, and
   a first erbium-doped fiber for amplifying the optical signal outputted from the first wavelength-selective coupler.

18. The dispersion-compensated optical-fiber amplifier according to claim 14, wherein the second amplifier comprises a second erbium-doped fiber for amplifying the optical signal received from the dispersion-compensating fiber and for reamplifying the optical signal traveling in the reverse direction.

19. The dispersion-compensated optical-fiber amplifier according to claim 14, wherein the splitter comprises:
   a second wavelength-selective coupler for outputting the optical signal received from the first amplifier to the dispersion-compensating fiber, and
   a third wavelength-selective coupler for outputting the optical signal received from the dispersion-compensating fiber to the second amplifier.

* * * * *